United States Patent [19]
Füssl

[11] Patent Number: 5,586,031
[45] Date of Patent: Dec. 17, 1996

[54] ROAD VEHICLE WITH ALL WHEEL STEERING, AND PROCESS FOR STEERING

[75] Inventor: Heinrich Füssl, Dinslaken, Germany

[73] Assignee: Kroll Fahrzeugbau-Umwelttechnik GmbH, Germany

[21] Appl. No.: 309,047

[22] Filed: Sep. 20, 1994

[30]    Foreign Application Priority Data

Sep. 20, 1993 [DE] Germany .............................. 43 32 287.5
May 6, 1994 [DE] Germany .............................. 44 16 790.3

[51] Int. Cl.$^6$ ........................................................ G06F 7/70
[52] U.S. Cl. ............................... 364/424.051; 364/424.01; 180/415; 180/197; 180/413; 280/707
[58] Field of Search ........................ 364/424.05, 424.01, 364/424.02; 180/140, 79.1, 169, 282, 168, 297, 142, 219, 226, 227, 213, 307, 413–415, 404–415, 422; 280/91, 6.11, 112.2, 91–92, 707; 318/587; 356/152.3, 375, 141.4, 140, 3.09; 250/559.33

[56]    References Cited

U.S. PATENT DOCUMENTS

| | | | |
|---|---|---|---|
| 4,092,931 | 6/1978 | Wulf et al. ................................ | 104/247 |
| 4,576,246 | 3/1986 | Stieber et al. .......................... | 180/168 |
| 4,625,822 | 12/1986 | Nakamura et al. ..................... | 180/140 |
| 4,662,469 | 5/1987 | Matsuda et al. ........................ | 180/219 |
| 4,667,744 | 5/1987 | Kauss et al. ................................ | 172/2 |
| 4,778,023 | 10/1988 | Sugasawa ................................ | 180/140 |
| 4,793,432 | 12/1988 | Tattermusch ........................... | 180/142 |
| 4,955,443 | 9/1990 | Bausch ..................................... | 180/79.1 |
| 4,998,596 | 3/1991 | Miksitz .................................... | 180/213 |
| 5,014,802 | 5/1991 | Knoll et al. ............................... | 180/140 |
| 5,076,382 | 12/1991 | Vaughn et al. .......................... | 180/140 |
| 5,092,419 | 3/1992 | Lieber et al. ............................ | 180/140 |
| 5,207,287 | 5/1993 | Sano et al. ............................... | 180/140 |
| 5,212,641 | 5/1993 | Iwata et al. .......................... | 364/424.05 |
| 5,238,077 | 8/1993 | Vaughn et al. .......................... | 180/140 |
| 5,238,257 | 8/1993 | Matsushita et al. ..................... | 280/91 |
| 5,402,341 | 3/1995 | Liubakka et al. .................... | 364/424.05 |
| 5,412,571 | 5/1995 | Eguchi et al. ....................... | 364/424.05 |

Primary Examiner—Kevin Teska
Assistant Examiner—Jacques Louis-Jacques
Attorney, Agent, or Firm—Schweitzer Cornman & Gross

[57]    ABSTRACT

A process for steering a road vehicle having all wheel steering for placing the vehicle into, within, and out of constricted spaces and small, constricted travel areas, the vehicle having a front, a rear, a longitudinal axis, front wheels steerable rear wheels, the all wheel steering being proportional between the front and rear wheels for turning the vehicle about a turning radius, apparatus for determining the distance of the vehicle from an obstacle, and apparatus for restricting or disabling the steerability of the rear wheels in response to the proximity of the obstacle, by driving the vehicle to the proximity of the obstacle, determining the distance of the vehicle from a location on the obstacle when the vehicle approaches the obstacle closer than by a predetermined distance, determining the relative angle of the longitudinal axis to the location on the obstacle, and adjusting the steering of the rear wheels in response to changes in the angular position to move the vehicle along the obstacle without the wheels contacting the obstacle. The road vehicle of the present invention has a longitudinal axis, apparatus for steering the vehicle along an obstacle a reference plane, with steerable front wheels mounted from a front axle, selectively steerable rear wheels mounted from a rear axle and adapted to be steered around a turning radius, on all wheel steering that is proportional between the front and rear wheels, apparatus for restricting or disabling the steerability of the rear wheels in response to the proximity of the reference plane, a front sensor for determining the proximity of the reference plane to the front of the vehicle, a rear sensor for determining the proximity of the reference plane to the rear of the vehicle, a computer adapted to receive signals from the front sensor and the rear sensor for determining the angle of the longitudinal axis to the reference plane, and apparatus for actuating the apparatus for restricting or disabling the steerability of the rear wheels toward the reference plane when the proximity to the reference plane falls below a predetermined distance at the rear of the vehicle.

15 Claims, 12 Drawing Sheets

ROAD VEHICLE WITH ALL WHEEL STEERING, AND PROCESS FOR STEERING

FIELD OF THE INVENTION

The present invention relates to a process for steering a vehicle, particularly in a narrow space, such as a delivery vehicle, a garbage truck, or a street sweeper, and to a steering apparatus for carrying out the process.

BACKGROUND OF THE INVENTION

Inner districts of large cities normally have very narrow streets and, therefore, there is little or no possibility of vehicles, particularly large vehicles maneuvering in those small areas. Thus, the maneuverability of utility vehicles, particularly ones of large loading capacity and dimensions is of increasingly great importance, especially particularly in inner districts of cities.

The reasons for this are that (a) for historical reasons, the inner districts are generally densely built, with narrow, winding streets and sharp-angled turns; (b) due to the increasing traffic density and parked vehicles traffic frequently ties up intersections; and (c) the slowing down of traffic such as by traffic islands, speed bumps, and narrowed roadways to limit the speed of vehicles, all greatly limit traffic movement, in view of the increasing extent of landscaping of traffic-free areas, less and less space remains available for vehicular traffic.

Since the inner regions of larger cities represent a concentration of industrial and business, as well as residential districts, considerable disadvantages for deliveries service and garbage removal services are burdens on such city districts due to their restricted traffic conditions. This can have a disadvantageous effect on the economic structure of such city districts. Since the handling of the deliveries and of garbage removal requirements of business and residential districts calls for an increasingly greater transportation capacity, larger transport vehicles are required for these activities. These larger vehicles have particularly larger problems in navigating within the decreasing space, because due to their large dimensions, vehicles are less maneuverable and require more room for maneuvering.

A number of vehicle manufacturers, particularly of utility vehicles used in the municipal field such as garbage trucks and street sweepers, have attempted to meet the requirements for the elimination of these problems. Thus various means are employed from a reduction in the loading capacity of the vehicles, all the way to technical improvements in maneuverability. The reduction in loading capacity, i.e. the reduction in transporting capacity, requires the use of additional vehicles, particularly for municipal use, which must then transfer their load to larger vehicles for further transportation thereof. This results in higher reloading costs, increased cost of personnel, increased interference with traffic in congested central areas to the larger number of vehicles, increased energy consumption, and increased air pollution.

One known improvement in the provision of greater maneuverability of large capacity vehicles, has been by providing a street sweeping machine with an all wheel steering capability. Such a street sweeping machine, is sold by RAMO Kommunal Fahrzeuge GmbH of Germany. It has a small turning radius and can maneuver in small spaces. All wheel steering offers considerable advantages in all driving and maneuvering situations, and enables a faster and more accurate control of the complicated traffic patterns in the inner city, but it has one decisive disadvantage. Due to the narrow parking spaces, vehicles of this kind approach the curbs of the sidewalk laterally. If the driver, with his all wheel steering, now steers strongly to the side away from the curb to move out of a parking space, the steered rear wheel of the all wheel steering hits the curb and rides over it. When the vehicle is heavily loaded it can damage the sidewalk, strike a sign or lamp post with the rear of the vehicle, and even hit pedestrians. It has been suggested to increase the field of view of the driver, but that cannot remedy this problem. The driver is too busy and cannot continuously note whether and when the steering of the rear wheels should be active or be deactivated, especially since in these situations the region to the rear with its moving traffic must also be observed.

It is also known to install means for detecting and optically displaying the steering angle of a steered wheel of a motor vehicle. German published patent application No. 4,035,794 discloses a device for optically displaying the steering angle of a steered wheel and the direction of travel of the vehicle. One disadvantage of this device is that the display does not automatically intervene in the steering or driving process but merely passively informs the driver of the detected steering angle. If the preprogrammed value of the steering angle is exceeded, the driver is advised of this by a sound alarm.

German published patent application No. 4,233,624 discloses a distance warning having an optical sensor system which detects an object or a vehicle that is within a preselected minimum distance, and gives the driver a suitable warning signal when the distance is less than the preprogrammed minimum. This device is also merely a passive parking aid and does not intervene in the steering of the vehicle.

German published patent application No. 3,438,021 discloses a control system for vehicles in which, electronic data processing and control systems are used to control the relationship of the steering angle of a rear wheel to the position of the front wheel, in accordance with the speed of the vehicle. The control system has a detector for forward travel which the steering angle is recorded in accordance with the speed of the vehicle, but this action can take place only if forward travel of the vehicle is maintained for a predetermined period of time. This apparatus, while having advantages of an automatic control device, has the disadvantage that upon the vehicle approaching obstacles, no assistance and adjustment signal is provided to the control mechanisms.

Similar information is provided by German published patent application No. 3,903,834 which is used on a automobile with four-wheel steering, and signals are obtained from various sensors about the steering of the front and rear wheels, and are transmitted to a computer. The computer acts on sensor abnormalities and thereby actuates power steering to improve the side steering of the front wheels and also controls the speed of the vehicle during the steering to achieve an accident free operation.

U.S. Pat. No. 4,955,443 discloses a similar system of computer controlled four wheel steering of motor vehicles.

The devices of the prior art have the feature in common that they do not provide any indication for controlling the steering of the rear wheels of an all wheel steering, and the rear wheels are controlled and moved separately from the front wheels. No prevention is provided against hitting existing obstacles and against driving over them. Such endangering of the surrounding area can result from the fact that upon steering the vehicle in a steady direction, and particularly when going around a curve, the steering of the wheels of the rear axle, actuated by the sensors, responds upon approach to an obstacle and the vehicle is steered out of the continuous direction of movement with the rear of the vehicle swinging out in the direction away from the obstacle and thus exposing other traffic the vehicle and itself to the danger of a collision. Another disadvantage is that, in the case of proportionally adapted steering motion of the two axles of the all wheel steering, upon movement of the front axle out of the continuous direction of movement, such as when steering around a curve from a forward travel of the vehicle, the wheels of the rear axle would follow the steering movement of the front axle. Since this is an interruption of a continuous movement, the wheels of the rear axle would no longer follow the previous direction of travel upon a change in the direction of movement, as a result of the all wheel steering the rear wheels follow the position of the wheels of the front axle, and can collide with an obstacle, such as a street corner curb.

In vehicles with engaged all wheel steering, there are considerable difficulties in getting out of narrow parking places spaces without extensive steering maneuvers. Vehicles without all wheel steering can free themselves more easily from such constricted spaces. There are no devices known which permit adaptation of the steering positions of vehicles with all wheel steering from narrow spaces, which move the rear wheels of the all wheel steering past an obstacle.

DESCRIPTION OF THE INVENTION

It is an object of the present invention is to provide a process for the steering of a motor vehicle, and apparatus for carrying out of this process, which enables the use of larger vehicles capable of moving large payloads such as utility vehicles in small, constricted travel areas, and on blind and dangerous travel paths. In accordance with the present invention, it is possible to travel around obstacles which are in the path of the large vehicle, avoiding uncontrolled movements as a result of avoidance measures by the vehicle and without colliding with the obstacles, safely and without danger under existing traffic conditions.

As used throughout the specification and the claims, the term "reference plane" denotes the surface of an obstacle, such as a curb or other object, that should not be collided with by the vehicle. As used herein, terminology such as "driving", or "steering" along a reference plane means driving by, towards or away from a reference plane such as a curb or other obstacle. Furthermore, as used throughout the specification and the claims, reference to "parking space" encompasses any narrow space into and out of which a vehicle is intended to maneuver.

In accordance with the present invention, this object is achieved in the manner that the rear wheel steering of a vehicle, particularly a utility vehicle for delivery and waste-disposal service can be blocked or restricted and the degree of the restriction in steering for the position of the vehicle with respect to the reference planes along which the vehicle can be moved along, steered into or brought out of is determined by the position of the vehicle with respect to the reference planes, such as a curb, roadside tree, or the like, or a parked vehicle, is measured and evaluated by a sensor of mechanical, electrical, or optical nature. The measurement sensor arranged on it, into touch with the reference plane or the contour of the street and the distance away as well as the relationship of the longitudinal axis of the vehicle to the reference plane is detected and evaluated and, after reaching an angular position of the longitudinal axis relative to the plane, and a therefore a changed distance of the vehicle from the reference plane, the all wheel steering is set so that the inward swung rear wheel, upon the movement of the vehicle, is directed and held to move directly along the reference plane.

One advantageous feature of the invention is that the detection of the distance of the vehicle from the reference plane is effected by mechanical means which are guided resiliently against the reference plane. Advantageously the distance of the vehicle from the reference is determined by contactless measurement sensors arranged on the vehicle.

One most suitable feature of the invention is that the setting of the rear wheels of the vehicle for the inward swinging is effected at a distance from the reference plane when the longitudinal axis of the vehicle is parallel to the reference plane whereby the rear wheel of the vehicle travels at a steering radius extending past the reference plane.

Another suitable development of the invention is that the setting of the rear wheels of the vehicle for the inward swinging is effected upon the longitudinal axis of the vehicle, enclosing an acute angle with respect to the reference plane at which point the rear wheel of the vehicle is at a minimum distance from the reference plane or rests against it. The measurement is made in accordance with the present invention by of a measurement sensor arranged in front of and close to the rear wheel of the vehicle, and the signal pulse given off by a sensor being evaluated under computer control and converted into the form of control signals which are imparted to a pulse generator of the all wheel steering.

In accordance with another advantageous feature of the invention, when there is a minimum distance of the rear wheel of the vehicle from the reference plane, the rear wheel axle of the all wheel steering is blocked from steering towards the reference plane.

One advantageous feature of the invention is that a steering of the rear wheels of the all wheel steering via the rear wheels in the direction towards the curb is interrupted and blocked when, as a result of sensing by a sensor or sensors, less than a predetermined minimum distance of the rear axle from the curb with the steering of the rear wheels of the all wheel steering being resumed as soon as the distance of the rear wheels from the curb has grown beyond that a minimum distance.

Another advantageous feature of the invention is that the steering process of the rear wheel of the all wheel steering is maintained so that the travel of the rear wheel is parallel to the reference plane until a given distance from the plane has been reached.

A further advantageous feature of the solution in accordance with the invention provides that the sensor signal pulses are evaluated by a computer in the vehicle and a control pulse is provided to the all wheel steering of the rear wheels. Two sensors can be arranged on the vehicle, however in that case only one sensor need be continuously connected to the computer. It can also be provided in practice that both sensors send out pulses which are simultaneously processed by the computer for the determination of the position of the vehicle with respect to the reference plane.

One advantageously pragmatic solution of the invention is that suitably a sensor is arranged on each side of the vehicle, both sensors being arranged on the side which faces the reference plane.

If the sensors are deactivated, the rear wheels of the vehicle are steered into and blocked in the straight, middle position.

Another feature of the present invention is that upon recognition of an obstacle during the movement of the vehicle in a continuous direction of movement, the proportionally adapted steering movement of the front and rear axles of the all wheel steering is terminated and the steering movement of the front and rear axles is decoupled, until the obstacle has been passed by independent steering. The wheels of the rear axle are held in the position in which they were set at the time of the detection of the obstacle and then, the rear wheel steering is again coupled with the front axle and the two axles are brought into a proportionally adapted steering relationship of the wheels.

An advantageous feature of the present invention is that the wheels of the rear axle of the vehicle, upon the detection of an obstacle and a change in the deflection of the wheels of the front axle, are held in the position which they had before the detection of the obstacle, and the rear wheels are then again brought into a proportionally adapted steering relationship with the steering position of the wheels of the front axle when the obstacle has been passed.

Advantageously, obstacles present or that suddenly appear in the course of the path of the vehicle or which are moving towards it, can be detected by sensors operating both on the right and left sides of the vehicle.

The detection of an obstacle can be suitably made on both sides of the vehicle and the output of the detection sensors is communicated to a computer for the stopping or starting of a steering motion of the all wheel steering for movement past the obstacle.

When the vehicle travels around a curve while wheels of both axles of the all wheel steering are turned, if the angle of turn of the front wheels is greater than that of both rear wheels, the measurement sensor which is operating outside of the radius of the turn is deactivated and then activated again after completion of the travel around the curve.

Another valuable feature of the present invention is that when an obstacle is detected early by the driver, he can intervene and disconnect the proportionally adapted steering movement of the all wheel steering. Upon that occurrence the wheels of the rear axle can, due to a safety circuit, remain in the position in which they were set at the time disconnection, and after the obstacle has been passed the driver can reconnect the proportional adapted steering made of the all wheel steering.

The device of the present invention suitably has sensors on the vehicle which have been brought into a functional relationship with a reference plane, such as a curb. Thus the longitudinal axis of the vehicle and its distance from the curb is determined, and is fed for evaluation to a computer which is connected to a setting mechanism for the rear wheels of an all wheel steering. The steering of the rear wheels toward the edge of the curb is blocked when a measured distance by the sensor or sensors is less than a predetermined value.

A front sensor and a rear sensor are directed toward the curb from one side of the vehicle to determine the angular position of the longitudinal axis of the vehicle with regard to the curb.

When the sides of the rear wheels is within a predetermined distance from the curb, the steering of the rear wheels of the all wheel steering is blocked so that only straight forward travel can be effected.

The contact members of the sensors are suitably a movable functional part of the vehicle, such as in the case of a street sweeper or a swingable disk brush, or a suction tube.

When the measurement sensors, are separate from other functional parts, and are freely operating sensors, arranged on the frame of the vehicle in the immediate vicinity toward the front, of the rear wheels, it is especially suitably that the sensors are directed at a right angle to the longitudinal axis of the vehicles and sensing towards both sides of the vehicle.

The sensor control for of the rear wheels can suitably be a simple bifunctional yes/no control, or a proportionally registering capacitative control so that suitably the rear of the vehicle, or the outer edge of the reference plane will, with the front wheels maximally turned, follow parallel to the reference plane until the vehicle has moved sufficiently far away therefrom along circular paths A, B, as shown in the drawing. One or two sensors in number could release a complete steering lock due to the increased distance between the reference plane and vehicle can cause, whereupon the vehicle can move away from the reference plane without dropping below the minimum distance "b".

Advantageously the sensor contact parts in a street sweeper, such as sensor brush and suction shaft, can be retracted or disconnected from sensing. In that case, the wheels of the rear axle are automatically adjusted to the central position and further turning is blocked.

The sensors, in agreement with the computer-controlled contacts, direct their control pulse signals exclusively towards the turning of the rear axle in the direction towards the side facing the curb.

Advantageously the vehicle is equipped on both of its sides with a sensor control for steering of the rear axle, but it is pragmatic and cost-favorable when the sensor control is arranged only one side of the vehicle, in the case of a right hand drive on the right side of the vehicle, and in the case of a left-hand drive on the left side of the vehicle.

The invention is based fundamentally on the idea that the continuous functioning of the all wheel steering during the operation of the vehicle is carried out as part of a normal program. Upon the occurrence of unforeseen events, which can include damage and approach to an obstacle, a safety program can be activated that is contained in the electronic system. This safety program can prevent an uncontrollable, intermittent steering relationship of the rear axle of the all wheel steering in the event of a defect in the proportionality relationship of the front and rear axles to each other. The normal program is so developed that (i) a direct, proportional steering relationship is established, under computer control by coupling the steering of the front and rear wheels; (ii) the steering angles of the proportional steering relationship of the axles, correspond fundamentally to the stipulated proportionality, with front and rear axles, being coupled via a computer; (iii) upon all steering movements, the wheels of the front and rear axles turn in a proportionally adapted ratio to each other; the sensors are in operation; and (v) no obstacle is present.

The safety program has features, whereby an obstacle is recognized by the sensor of sensors or by the driver of the vehicle, the normal program is disconnected, the rear axle does not follow the steering angle of the front axle but remains in the position which it had at the time of the recognition of the obstacle, until the sensor no longer detects an obstacle, whereupon the normal program is resumed, and the rear axle moves again into the proportionally adapted steering relationship with the front axle.

The safety program is engaged upon the detection of an obstacle, by the computer or by the driver, with the result that the rear axle remains in its position and assures travel past the obstacle. In this connection, it is immaterial on which side the obstacle is located.

As the vehicle moves in a circle, its side facing the small radius will, upon change in the steering angle of the wheels of the front axle, most likely abut predominantly against an obstacle, since the front edge of the outer side of the vehicle which faces the larger radius has already passed the obstacle and the vehicle moves away from the obstacle upon its continued motion. However, upon a change in the continuity of the direction of movement, the inner side of the vehicle approaches the obstacle to such an extent that a collision can result. To avoid striking the obstacle, the wheels of the rear axle then remain in the steering position set upon recognition of the obstacle and thereby move the vehicle around the obstacle. The sequence of the normal program, coordinated with the actuation of the safety program upon recognition of obstacles, either by the sensor which signals a computer which starts the running of the program, or by manual actuation of the driver, who notices the presence of an obstacle, creates absolute assurance that the rear part of the vehicle will not, in uncontrolled manner, suddenly move out of its direction of travel and endanger traffic. The holding of the wheels of the rear axle in the steering position which was present upon the recognition of the obstacle enables traveling around the obstacle, and then again assuming the adapted steering proportionality of the axles when the safety risk has been eliminated.

DESCRIPTION OF THE DRAWING

The invention is described further in detail with reference being had to the accompanying drawing, wherein.

DETAILED DESCRIPTION OF THE INVENTION

Figure 1:
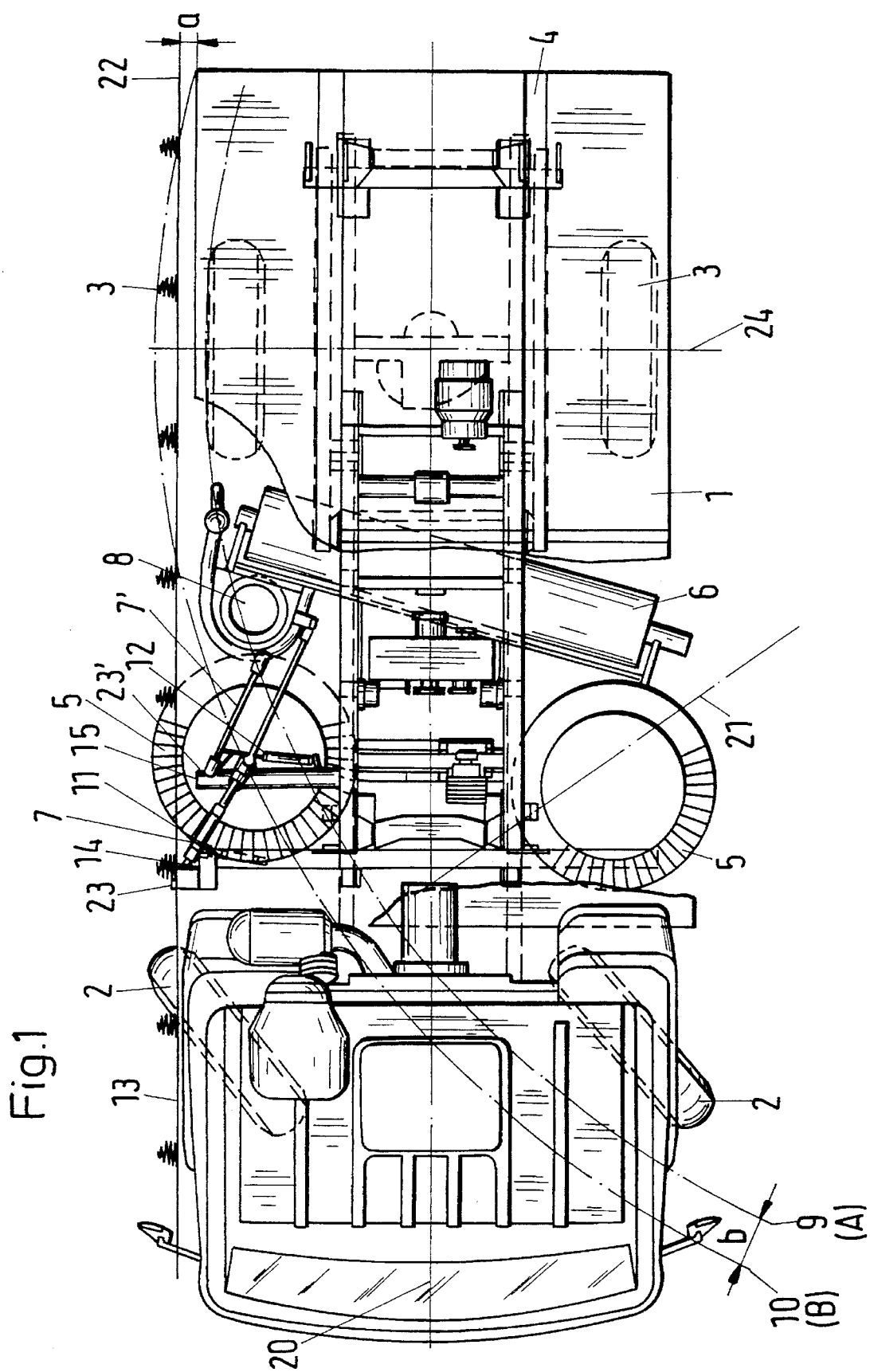
FIG. 1 is a top view of a vehicle along a curb.

A vehicle 1, for instance a street sweeper, is shown in FIG. 1 having two disk brushes 5, a suction shaft 8, and a roller brush 6 which are arranged below the vehicle 1 and are attached to its frame. The rear wheel 3 of the vehicle at a minimum distance "a" from the reference plane of a curb 13, the rear wheel 3 being directed for straight-ahead travel and front wheels 2 being in a position turned away from the reference plane. The disk brush 5 and the roller brush 6, as well as the suction shaft 8, are connected to the vehicle frame 4 by means of rods 7, 7' through mounts 23, 23' in the region of pivot points 14. 15. As can be noted from FIG. 1, the rear wheel 3 of the vehicle 1 which faces the reference plane is at a minimum distance "a" from the curb 13.

Figure 3:
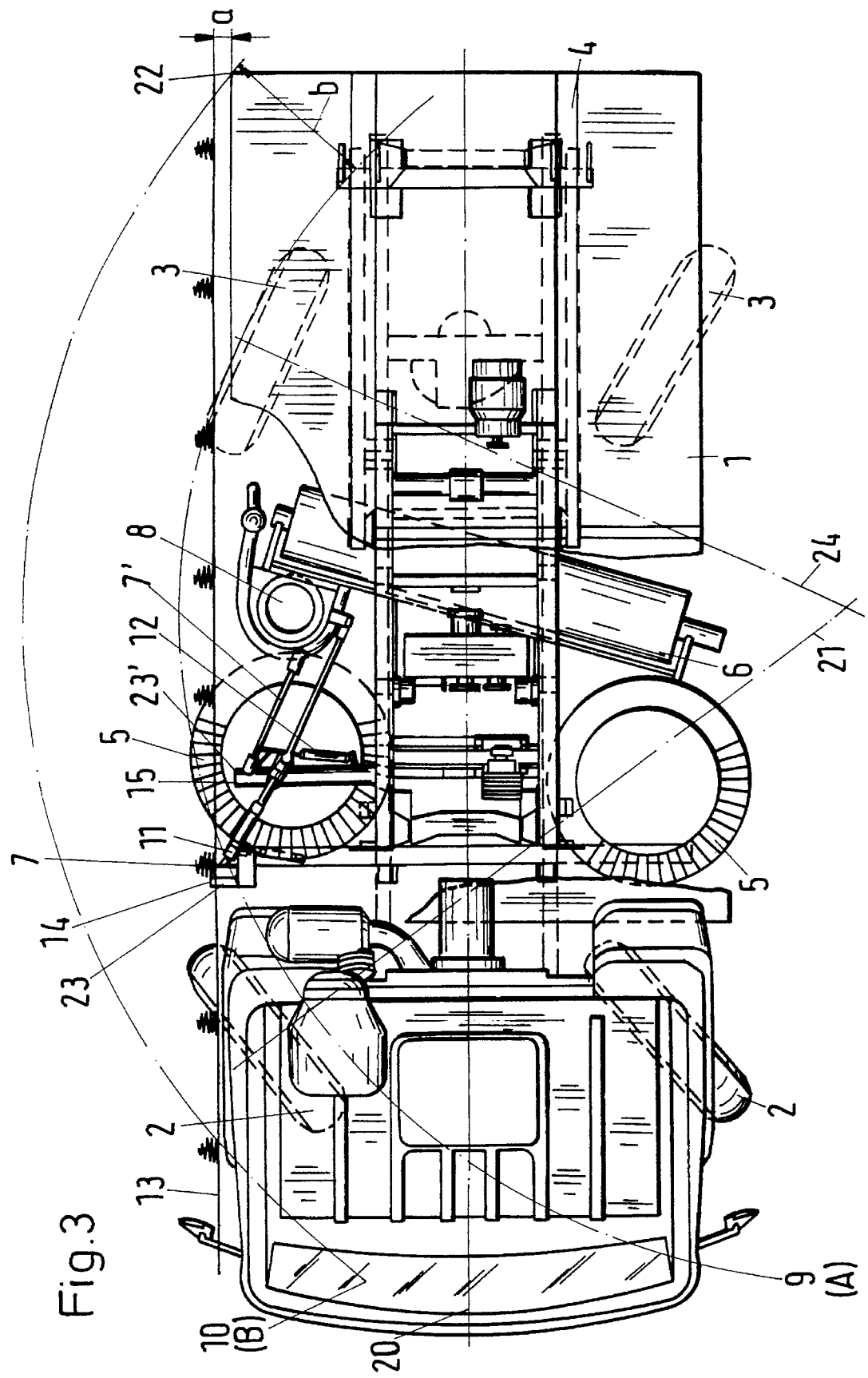
FIG. 3 is a top view of the vehicle of the prior art with indication of the path of travel of the vehicle with wheels fully turned from a minimum distance from the curb.

In this position, the all wheel steering arrangement on the vehicle 1 can be actuated only to a limited extent since otherwise, upon a turning of the rear wheels 3 towards the curb 13, the rear wheel 3 which is positioned against or near the curb 13 would move over the curb 13. When in this position a strong steering angle of the rear wheels 3 is set towards the curb, such as to avoid a parked vehicle, the turned rear wheel abuts against or run over the curb and may even damage the sidewalk, as well as the rear of the vehicle can strike against posts, signs and street lights located on the edge of the street and even endanger pedestrians. Such a situation is shown in the illustration in FIG. 3 of the prior art to demonstrate its disadvantages. That figure shows the vehicle 1 in a position in a minimal distance "a" of the rear wheel 3 of the vehicle 1 from the curb 3 is provided and the disk brushes 5 and the suction shaft 8 are swung below the vehicle 1. In this position of the vehicle 1, its rear wheels 3 abut against the curb as explained above. It can be seen from this showing, not only the rear wheel 3 which faces the curb 13 passes over it but, also the edge 22 of the body of the vehicle swings out far over the curb 13.

Figure 2:
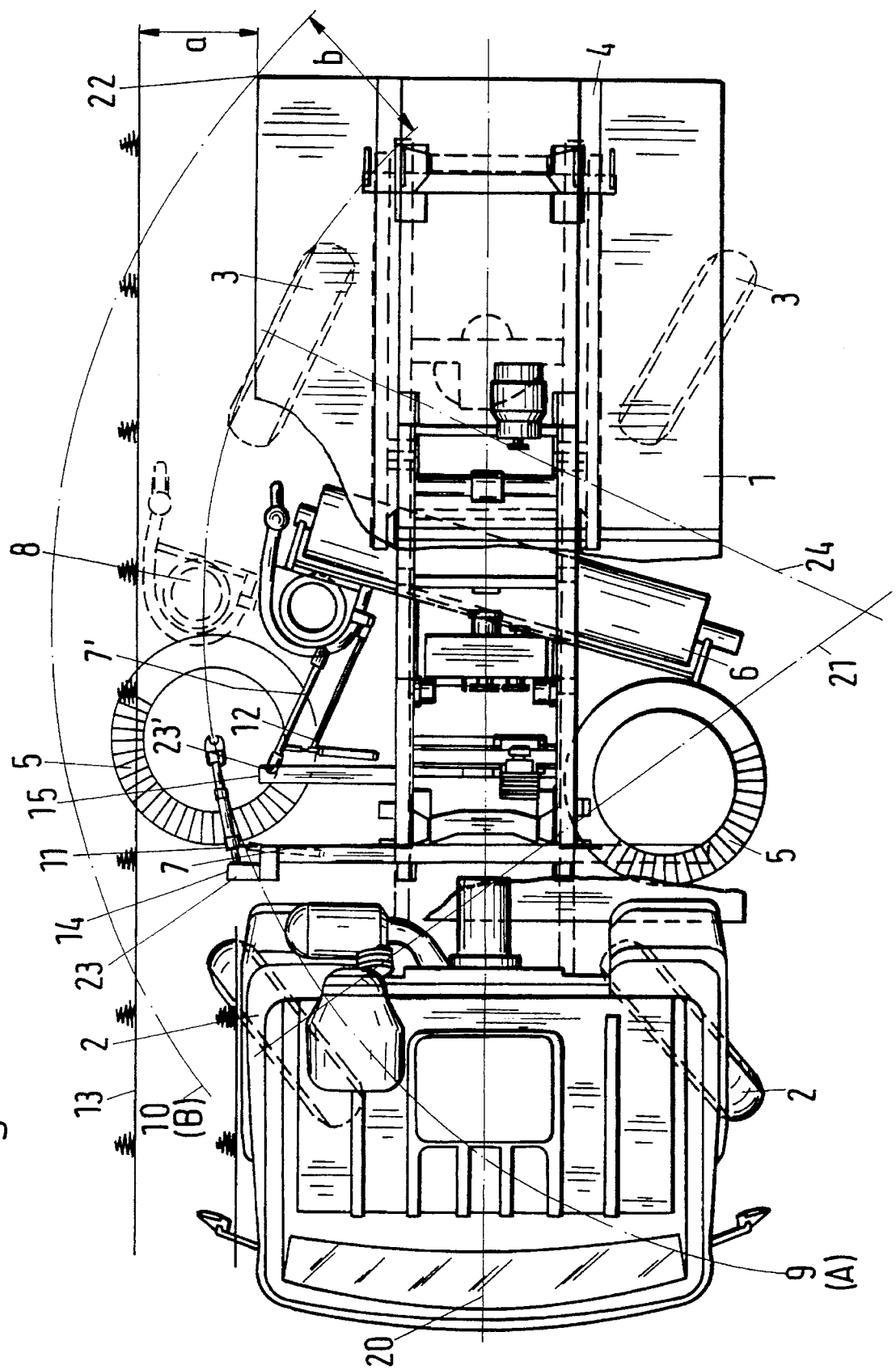
FIG. 2 is a top view of the vehicle of FIG. 1 at a distance from the curb with all wheels fully turned upon moving out of a parking space.

For this reason, as shown in FIG. 2, in accordance with the present invention the steering of the rear wheels 3 is blocked in the direction of the curb 13. The block is released when the distance "a" increases due to the movement of the vehicle 1 away from the curb 13 by a turning of the front wheels 2. The longitudinal axis 20 of the vehicle at that time leaves its position parallel to the curb 13 and the distance "a" between the front wheels 2 and the curb 13 increases. This situation is also shown in greater detail in FIGS. 6 and 7.

Due to the fact that the rear wheel 3 rests against the curb 13 and the longitudinal axis 20 of the vehicle is parallel to the curb 13, the sides of the vehicle 1 coincide with the curb 13, and the disk brush 5 together with its rod 7 moves below the vehicle 1 to lie against the curb 13. An actuating cylinder 11 having a sensor 16 is arranged on it, is connected to the rod 7.

Figure 4:
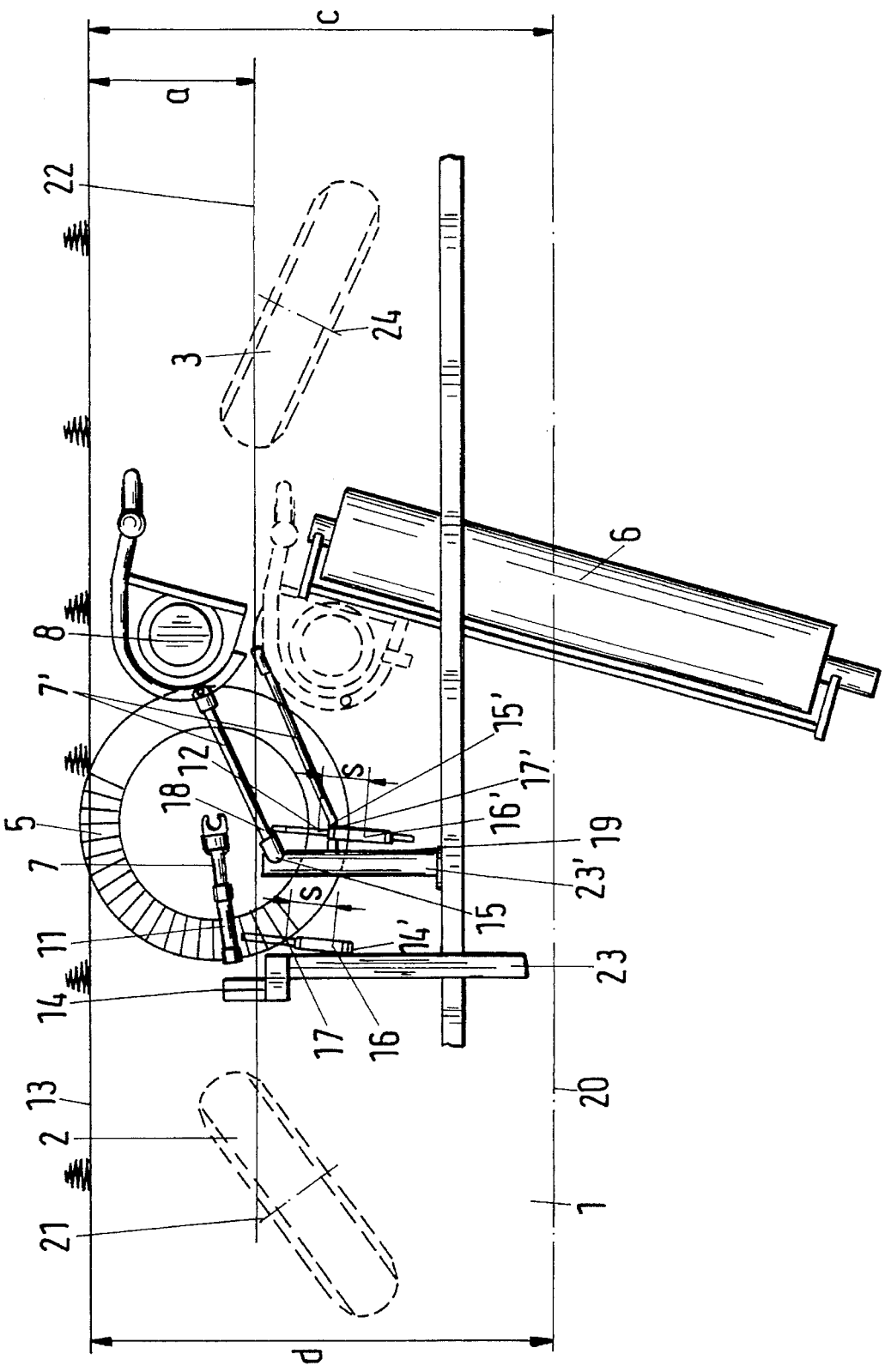
FIG. 4 shows the arrangement of the sensors in the case of maximum distance of the rear wheel from the curb.

In a position, moved also below the vehicle 1 there is the suction shaft 8 which, positioned on a rod 7', is in its normal position in front of the roller brush 6, and its rod 7' is moved by the actuating cylinder 12 with the sensor 16' fastened on it. FIG. 2 shows this position, in which the suction shaft 8 as well as the disk brush 5 are swung out from under the circumference of the sweeper against the curb 13 and, as a result, the distance "a" of the rear wheel 3 has reached its greatest value without the disk brush having lost contact with the curb 13. The suction shaft 8 is also shown in an outward swung position which permits a pure suction operation. The suction shaft 8 is positioned on the side of the curb 13, outside the circumference of the vehicle 1. In this position, the side brush can be swung in and raised as shown in, and further explained in connection with FIG. 7. FIG. 4 shows the arrangement of the functional parts below the vehicle 1 in the position shown in FIG. 2.

The distance "a" of the rear wheel 3 of the vehicle 1 from the curb 13 is sufficiently large to permit a dependable swinging out of the fully turned rear wheels when the blocking of the all wheel steering for the rear wheel 3 is released, without it moving over the curb 13. In this position, the disk brush 5 and the suction shaft 8 are in a position beyond the edge of the vehicle 1, the disk brush 5 being still in contact in its swung-out position, with the side surface of the curb 13. The longitudinal axis 20 of the vehicle parallel to the curb 13. The rods 7, 7' of the disk brush 5 and the suction shaft 8 are pivotally connected by mounts 23, 23' with the frame 4 of the vehicle through the pivot points 14, 15.

The rod 7 of the disk brush 5 is movably connected to an actuating cylinder 11, and the rod 7' of the suction shaft 8 is movably connected to the actuating cylinder 12. Sensors 16, 16' are arranged on the actuating cylinders 11, 12, and these are functionally connected with sensor points 17, 17' provided on the pivot heads of the piston rods of the actuating cylinders 11, 12. A path "s" is located between the sensors 16, 16' and the sensor points 17, 17'. The path "s" is variable and is formed by the position of the extended piston rod, which, in combination with the actuating cylinders 11, 12, holds the rods 7, 7' of the disk brush 5, and the suction shaft 8 in contact with the inner surface of the curb 13.

It is possible to bring the disk brush 5, together with the suction shaft 8, into contact with the curb 13, but the disk brush 5 and suction shaft 8 operate independently of each other. Therefore, their actuating cylinders 11, 12 are also provided with separate sensors 16, 16' and sensor point sensor arrangements points 17, 17'. It is possible to actuate the two sensors 16, 16' simultaneously, but the two arrangements 16, 16' and points 17, 17' generally operate with separate settings and control circuits of the computer.

As it has been emphasized, the suction shaft 8 can also be brought into an operating position independently of the disk brush 5, and in that case it assumes the contact function required for the operation of its sensor 16'. The sensor 16' is separately connected to the computer and controls the steering function of the rear wheels 3 independently of the disk brush 5. In the pure suction function of the pneumatic operation of the suction shaft 8, the disk brush 5 is retracted and swung upward. The sensor 16 is deactivated and the sensing function of the sensor 16' is assumed by the edge of the suction orifice which is arranged on the suction shaft 8.

As shown in FIG. 4, the longitudinal axis 20 of the vehicle 1 is parallel to the curb 13 and the distance "a" between it and the rear edge 22 of the vehicle 1 becomes so great that the rear wheels can be conveniently turned by the inward turning of the all wheel steering without running over the curb 13. The distance "a" is such here that the disk brush is fully swung outward but does not lose contact with the inner edge of the curb 13. The drawing shows that the paths "s" of the sensors 16, 16' on the actuating cylinders 11, 12 are at a substantial distance from the sensor points 17, 17'. This means that the actuating cylinders 11, 12 are outwardly extended. The two paths "s", and therefore the distance of the sensors 16, 16' from the sensor points 17, 17', are approximately at a maximum, but of the same magnitude.

Figure 5:
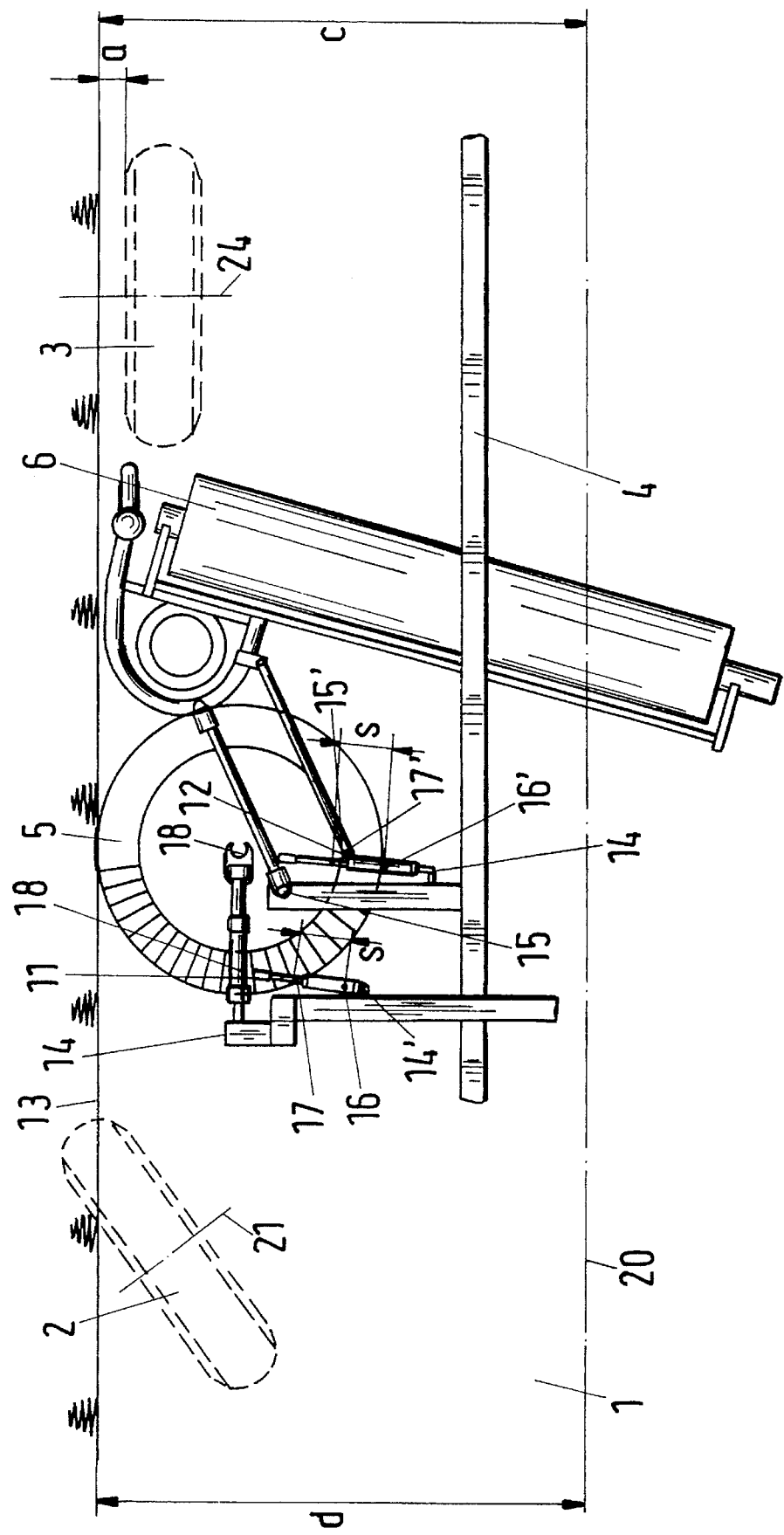
FIG. 5 is a showing similar to FIG. 4, with minimum distance of the rear wheel from the curb.

FIG. 5 shows the position of the vehicle 1 relative to the curb 13, in the same position as in FIG. 1. In this case, the disk brush 5, and the suction shaft 8 are swung inward under the body of the vehicle 1, and the distance "a" of the rear wheel 3 of the vehicle 1 from the curb 13 is so small that the rear edge of the vehicle 3 rests against the curb 13. The longitudinal axis 20 of the vehicle 1 is at a parallel distance if c=d from the curb 13. In this position of the vehicle 1, and therefore with the disk brush 5 and suction shaft 8 swung inward, the paths "s" between the sensors 16, 16' and the sensor points 17, 17' on the actuating cylinders 11, 12 are very short since the piston rods are retracted into the cylinders.

In this position, the suction shaft 8 is located in front of the roller brush 6 and its sensor 16' is disconnected from the control circuit. The contact function is assumed by the sensor arrangement 16, 17 of the disk brush 5 which contacts the curb 13. In this position, the rear wheel 3 is locked against being steered on the direction to the curb 13.

Figure 6:
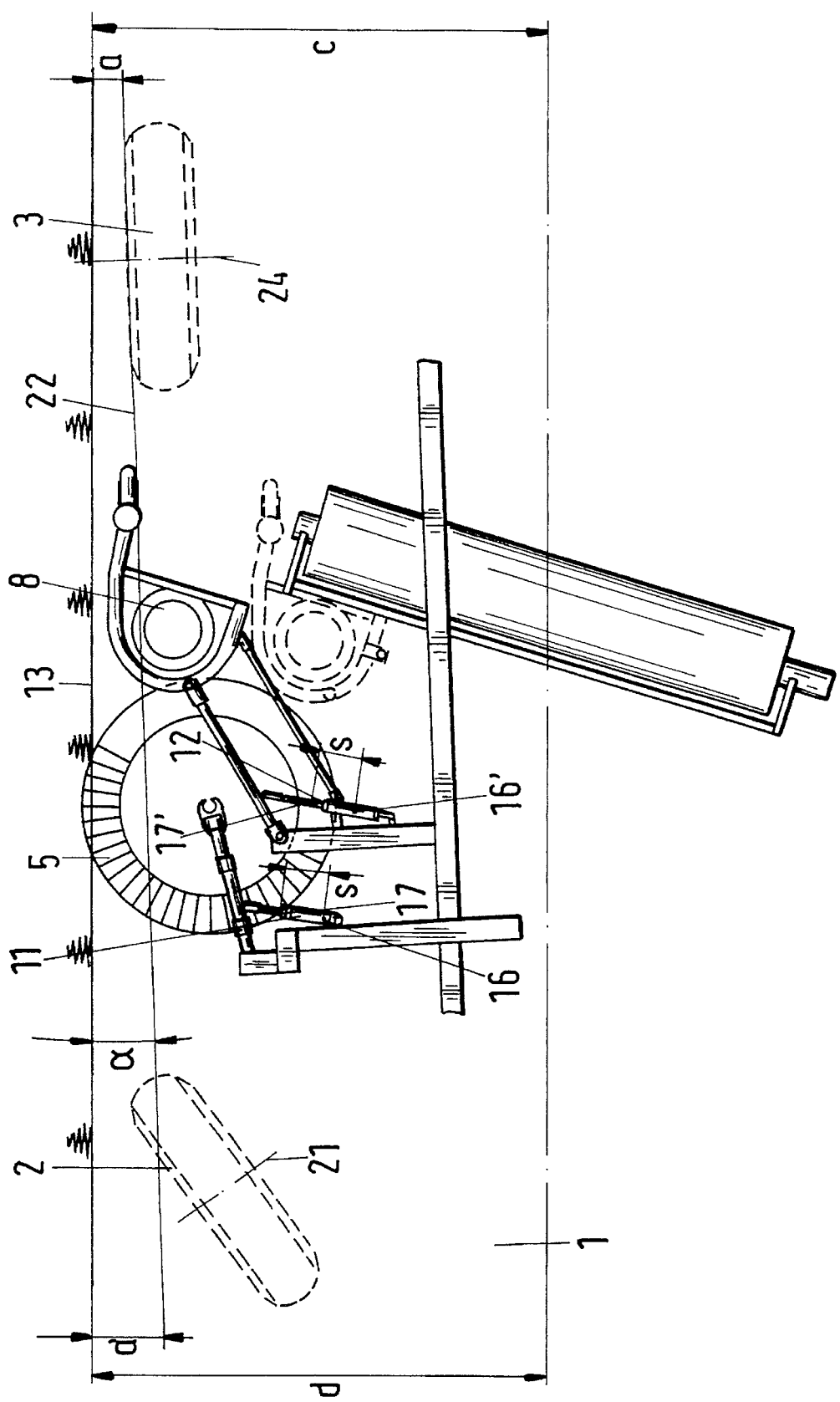
FIG. 6 is a showing similar to FIGS. 4 and 5, with different distances from the curb.

The front wheels 2 are in a steered position; the vehicle 1 starts to move into the position shown in FIG. 6. This position shows one possibility in which the disk brush 5 and the suction shaft 8 have been swung out and brought into contact with the curb 13. The two sensors 16, 16' operate independently, but this position is not the general case. As a general rule, only the disk brush 5 is moved by its rod 7 against the curb 13.

FIG. 6 shows the position of the vehicle in a parking place from which it is about to be driven out. In this position of the vehicle, the distance "a" the rear wheel 3 to the curb 13 is the same as that shown in FIG. 5. However, the longitudinal axis 20 of the vehicle 1 is angled away by an angle α from the curb line 13, so that the front distance "d" of the longitudinal axis from the curb is greater than the corresponding rear distance "c". The steering process commences in this position of the vehicle; the rear wheels are still locked for travel but straight, ahead they already start to move away at an angle α from the edge of the curb. The disk brush 5 is always in contact with the side of the curb 13. As shown, this can also be true of the suction shaft 8, which is also in an equivalent position with respect to the disk brush 5.

FIG. 6 shows that upon an increase of the angle α and a distance "a" the locked condition of the all wheel steering of the rear wheels is released and thus the steering of the rear wheels 3 is commenced. Although the center axes 24 of the rear wheels 3 remain perpendicular to the curb 13, and thus the rear wheels 3 travel parallel to the curb 13, while the axis 21 of the steered wheel is moved in increasingly sharper angle from the curb 13, the distance "d" of the longitudinal axis 20 from the curb steadily increases. Thus, the vehicle swings out of the parking space, the rear wheels 3 move parallel to the curb, until a distance for a given value of the angle α with respect to the curb 13, and then increasingly leave the curb 13 while increasing the distance "a" by following the radius of the center axis 24 of the rear wheels 3. The rear edge 22 of the vehicle 1 does not swing outward above the curb 13. FIG. 6 shows that the signaling pulse for the computer, which actuates the control of the all wheel steering, is affected by the sensor 16 when the suction shaft 8 is functionally coordinated with the disk brush 5.

When solely the suction shaft 8 used to pick up street dirt the disk brush 5 can be swung inward and the suction shaft 8 can be in a completely separate swung-out operating position spaced from the disk. The sensor 16' is arranged for this purpose on the actuating cylinder 12. In this manner of operation, the sensors 16, 16' each act differently on the actuating cylinders 11, 12 independently of each other, and impart their pulses separately to the common computer. As in all operating and steering situations the computer weights the pulses and thus controls the steering actuation of the rear axle. A separate actuation of the suction shaft in a purely pneumatic manner of operation. The suction shaft 8 slides with an outer edge of the suction opening along the inner surface of the curb 13 for a separate, purely suction operation of the sweeper 1. This assures the separate functioning of the sensors 16, 16'.

Contacting of the disk brush 5 with the curb 13 is brought about by the sensor 16 contacting the sensor point 17 and since, in its general operating position the suction shaft 8 is associated with the roller brush 6, the sensor arrangement 16', 17' is disconnected from the control circuit.

As the vehicle 1 moves out from the parking space, control of the steering is assumed by the disk brush 5 which is in contact with the curb 13, and the actuating cylinder of which has the sensor 16 which, in cooperation with the sensor point 17, the pulses provides control pulses to the computer to steer the rear wheels 3. Control of the vehicle 1, particularly as a utility vehicle is, of course, not limited to the illustrated example of a sweeper, but can be used in all kinds of utility vehicles.

Figure 7:
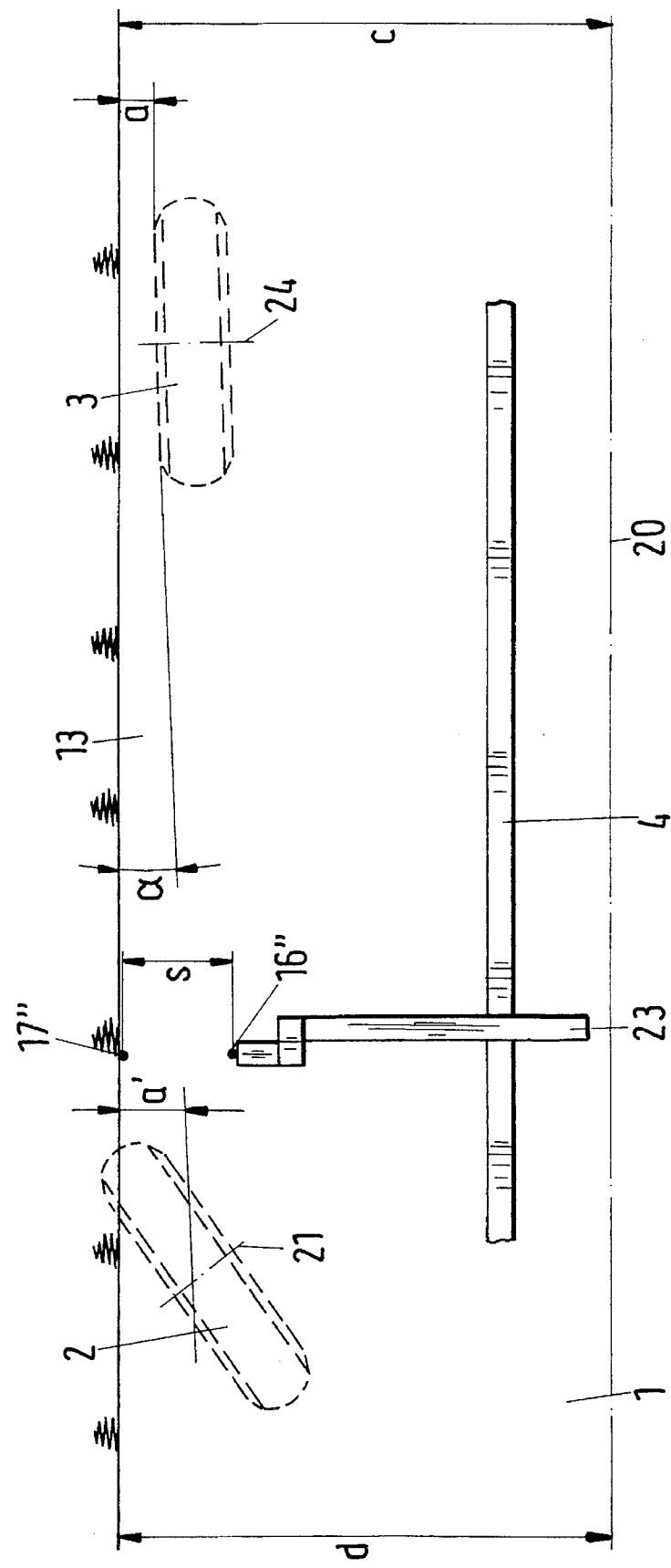
FIG. 7 shows the sensor arrangement for contactless scanning of a measurement distance with a minimum distance of the rear wheel from the reference plane in the case of utility vehicles.

The contact-controlled generation of control pulses, as stated by reference to the example of the disk brush 5 against the curb 13 or the like use of the suction shaft 8 in the above described embodiment of a street sweeper, can be employed with other contacting devices such as measuring sensors, measuring wires, or on the same basis to a contactless sensor-controlled arrangement. Such a contactless sensor arrangement is illustrated in FIG. 7 in which the vehicle 1 is disposed relative to the curb similarly as shown in FIG. 6 which shows a street sweeper. As the vehicle begins to move away from the curb, the distance "d" between the longitudinal axis 20 of the vehicle and the curb 13 has then increased by the steering of the front wheels 2 of the vehicle 1 by the forward movement vector of the vehicle 1, while the distance "a" of the rear wheel 3 from the curb 13 remained approximately the same since the distance "c" of the rear part of the longitudinal axis 20 of the vehicle from the curb 13 has not changed. A contactless sensor 16" such as a light pulse, or ultrasonic sensor is arranged on the vehicle frame 4 by a mount 23 directly in front of the rear wheel 3, the sensor path of which is directed towards the of the curb 13 with its sensor target point 17 at the curb. As the distance "d" of the longitudinal axis of the vehicle from the curb 13 increases by a constant distance "a" as the vehicle moves forward with turned steering position of the front wheels 2, and therefore the same amount as the distance "c" of the longitudinal axis 20 of the vehicle from the curb 13, the distance "s" between the sensor 16" and the sensor point 17" changes in the same proportion to the distance "a". When the distance "s" reaches a predetermined value, steering of the rear wheel 3 is commenced, the wheel travels parallel to the curb 13 even as the value of the distance "a" to the curb 13 increases, until a predetermined distance "s" is reached and the longitudinal axis 20 of the vehicle reached an angle α with respect to the curb 13 which permits passage out of the parking space at the largest possible acute angle.

It can be seen from these explanations that the principle of the contactless measurement of the distance "s" by of sensors, as shown in FIG. 7 for all other types of utility vehicles with all wheel steering, is also possible for installation in a street sweeper. In that case, the actuating cylinders 11, 12 do not cooperate with the corresponding sensor arrangements but serve solely for the hydraulic actuation and bear no sensors or sensor points on their functional parts. The advantage of the sensor-controlled all wheel steering is further increased, in the example of a sweeper, by the fact that the disk brush 5 can be swung outwardly of the circumference of the vehicle. This way the advantage of all wheel steering, with the swinging in and out of the disk brush 5 with respect to the circumference of the vehicle upon commencement of contact at the point "k" with the curb 13, enables the vehicle 1 to approach the curb 13 to a minimal distance "a" which is almost zero, while the side brush swings under the vehicle. During the turning maneuver of the front wheels 2 of the vehicle 1, the rear wheels 3 remain parallel to the curb 13 while minimally spaced from the curb, as the rear wheel 3 by all wheel steering is steered continuously under computer control parallel to the curb 13. Since the turning vector of the movement of the vehicle produces a constantly larger angle α of the longitudinal axis 20 of the vehicle 1, the disk brush 5 swings out into its end position beyond the circumference of the sweeper. In this position the end of the pulse path "s" is reached, and the vehicle 1 is at a required angle α since its side brush disk has swept at a maximum distance "s'" along the curb 13.

Figure 8:
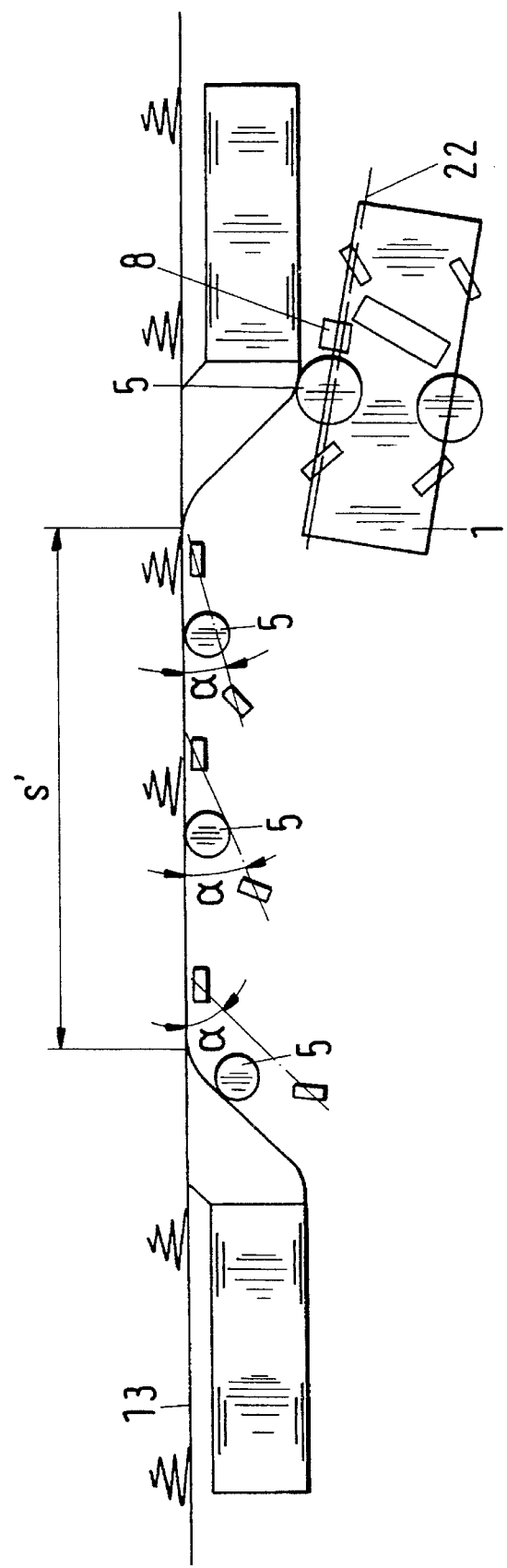
FIG. 8 shows the movement of a street sweeper upon sweeping in a small parking space area with sensor-controlled all wheel drive.

This described activity is shown in FIG. 8 as path of movement of e.g. a sweeper, the disk brush 5 and/or suction shaft 8 of which are used as contact makers for the sensors 16, 16', 16". This enables sweeping into small parking spaces along the curb 13, and in the same way, garbage trucks or delivery vehicles can also be easily parked into small travel parallel to the curb 13. A great advantage of the present invention enables all vehicles of this type to function in this manner, since upon leaving a parking place with the sensor-controlled all wheel steering, the vehicle will not run over the curb 13, and the of the rear edge 22 of the vehicle 1 will not swing over the sidewalk beyond the curb 13.

Figure 9:
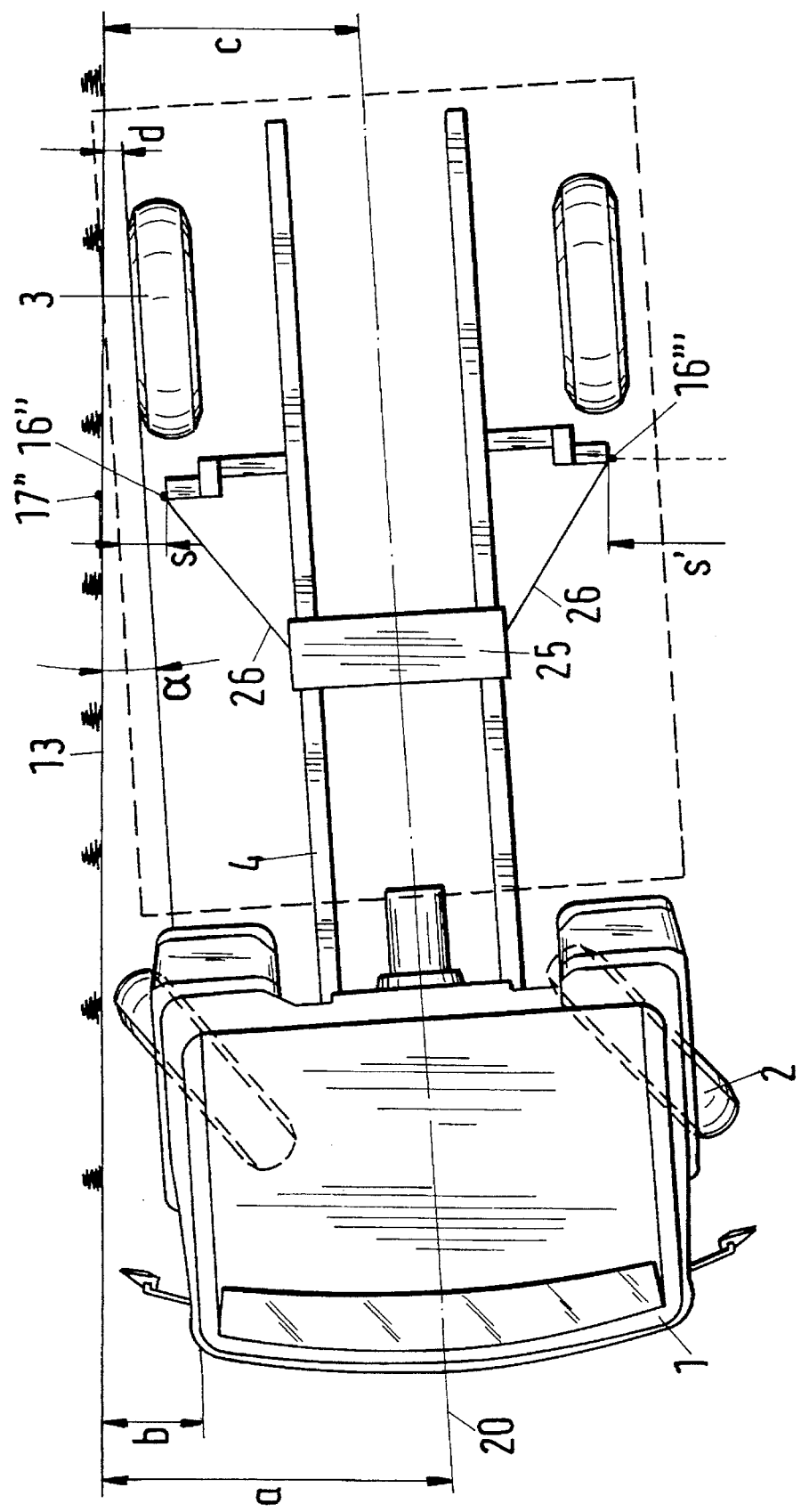
FIG. 9 shows a vehicle at a reference plane with sensors arranged on both sides.

FIG. 9 shows the vehicle 1 in a parking place in an angular position of its longitudinal center axis 20 with the angle α to the curb reference plane 13, operatively contacted by the sensor 16". The reference plane 13 serves in this case as an obstacle. The longitudinal axis 20 of the vehicle 1 is at a greater distance "a" from the curb at the front of the vehicle 1. At the angle α, the distance "b'" of the front axle from the reference plane 13 is greater than the distance "d" of the wheel 3 of the rear axle. The sensors 16", 16'" act over the sensor paths "s", "s'" to detect obstacles which can counter the movement of the vehicle 1. The sensor path "s" is limited by the sensor point on the contact point 13 and shows the presence of the curb as an obstacle. If no obstacle appeared in front of the sensor 16'", the sensor path "s'" is still unlimited and therefore without sensor point.

In its starting position, has the wheels 2, 3 of both axles of the vehicle point straight ahead. The sensor 16" in this case has recognized the reference plane 13 as an obstacle, and to move out of the tight travel place, the driver turned the front wheels way from the curb, to move out. Since the sensor 16' has recognized an obstacle at the reference plane 13, the wheels 3 of the rear axle, following the safety program, remain in the straight ahead position. This assures that the rear wheels 3 do not strike the obstacle but are steered past it. Sensors 16", 16'" are arranged directly in front in the direction of travel of the wheels 3 of the rear axle. The drawing shows that the sensor 16'" is not in an operative contact due to the absence of an obstacle to sense. The rear wheels 3 are maintained in their previously set steering position is by the recognition of an obstacle by the sensor 16'.

It is also possible to disconnect the electronic recognition of obstacles and to leave the recognition of the obstacles and the avoidance reaction to the steering of the vehicle by the driver. For this purpose an operating element (not shown) is arranged in the cab. A switch 25 is fastened on the vehicle frame 4, the sensors 16", 16'". The switch 25 is connected to a computer (not shown) and it transmits to it the control pulses from the sensors 16", 16'". The computer controls the proportionally adapted movement of the all wheel steering of the vehicle 1. Due to the fact that the sensor 16" is connected with the sensor point at the reference plane 13 for the recognition of an obstacle, the switch 25 is activated and, gives off for the side to which the sensor 16" radiates, a control pulse to the computer signaling recognition of a point of contact, in this case the reference plane 13. The sensor 16'" does not require contact with an obstacle and does not activate the switch 25. Thus the computer notes no obstacle from that sensor When two sensors 16", 16'", operate in front of wheels 3 of the rear axle and radiating laterally from the vehicle, no right/left recognition takes place since this is not necessary for the running of the computer program. There is merely a recognition of a plane of reference or obstacle and the activation of a corresponding program. When traveling around curves the sensor 16", 16'" which radiates towards the outside of the radius of the curve is disconnected by the switch 25.

Figure 10:
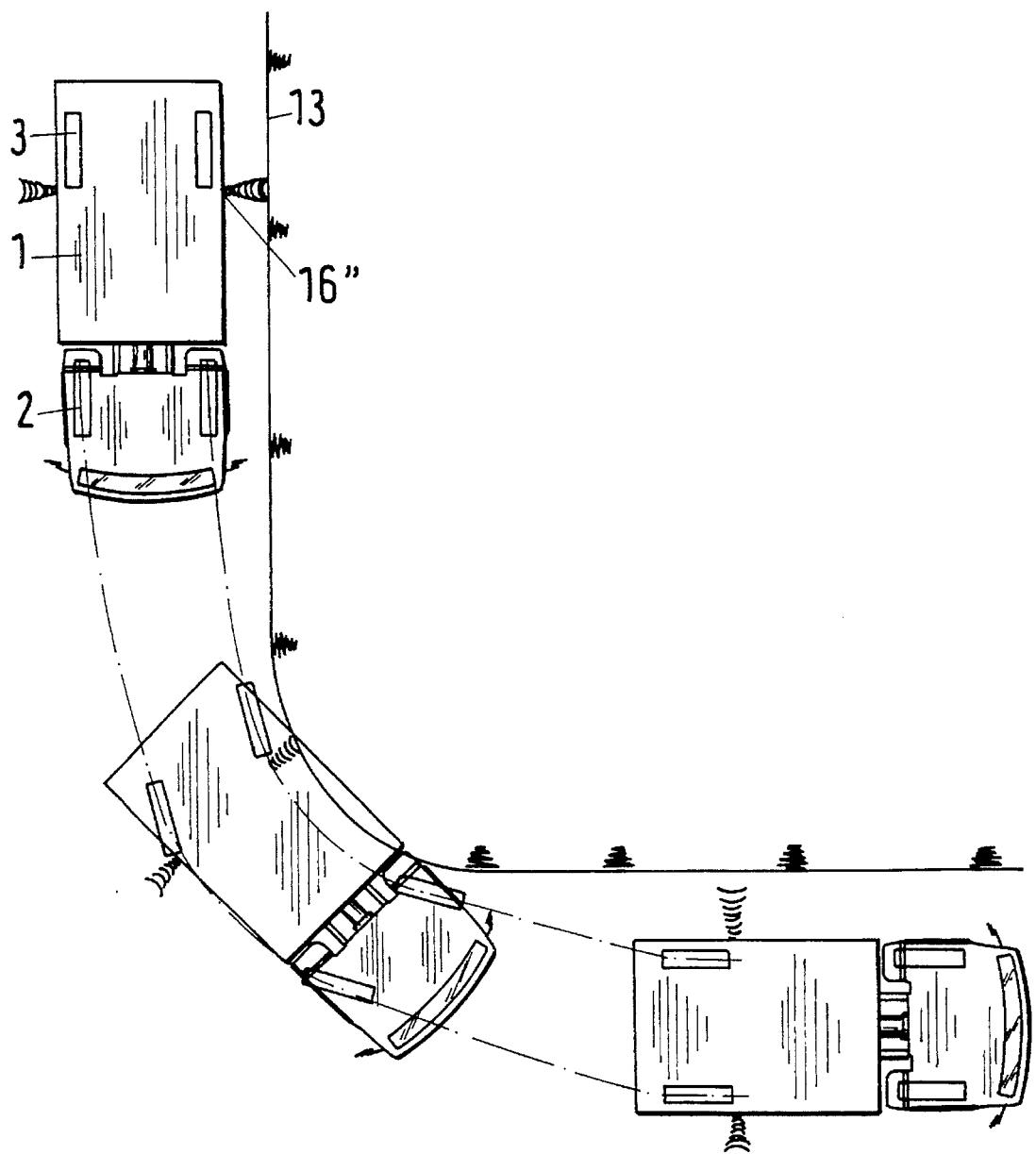
FIG. 10 shows the movements of the vehicle upon execution of the normal driving program.

FIG. 10 shows the passing of the vehicle 1 along a uniformly curved path around an obstacle, such as a street corner. The reference plane 13 is scanned by the sensor 16" and since the distance to the reference plane 13 does not change and therefore no obstacle is signaled by the sensor 16", the normal program, namely the proportionally adapted steering process, is not interrupted. The proportional steering position of the wheels 2, 3 of both axles remains the same with respect to each other within the program, and the vehicle 1 travels unimpeded past the reference plane 13 since no obstacle has been recognized.

Figure 11:
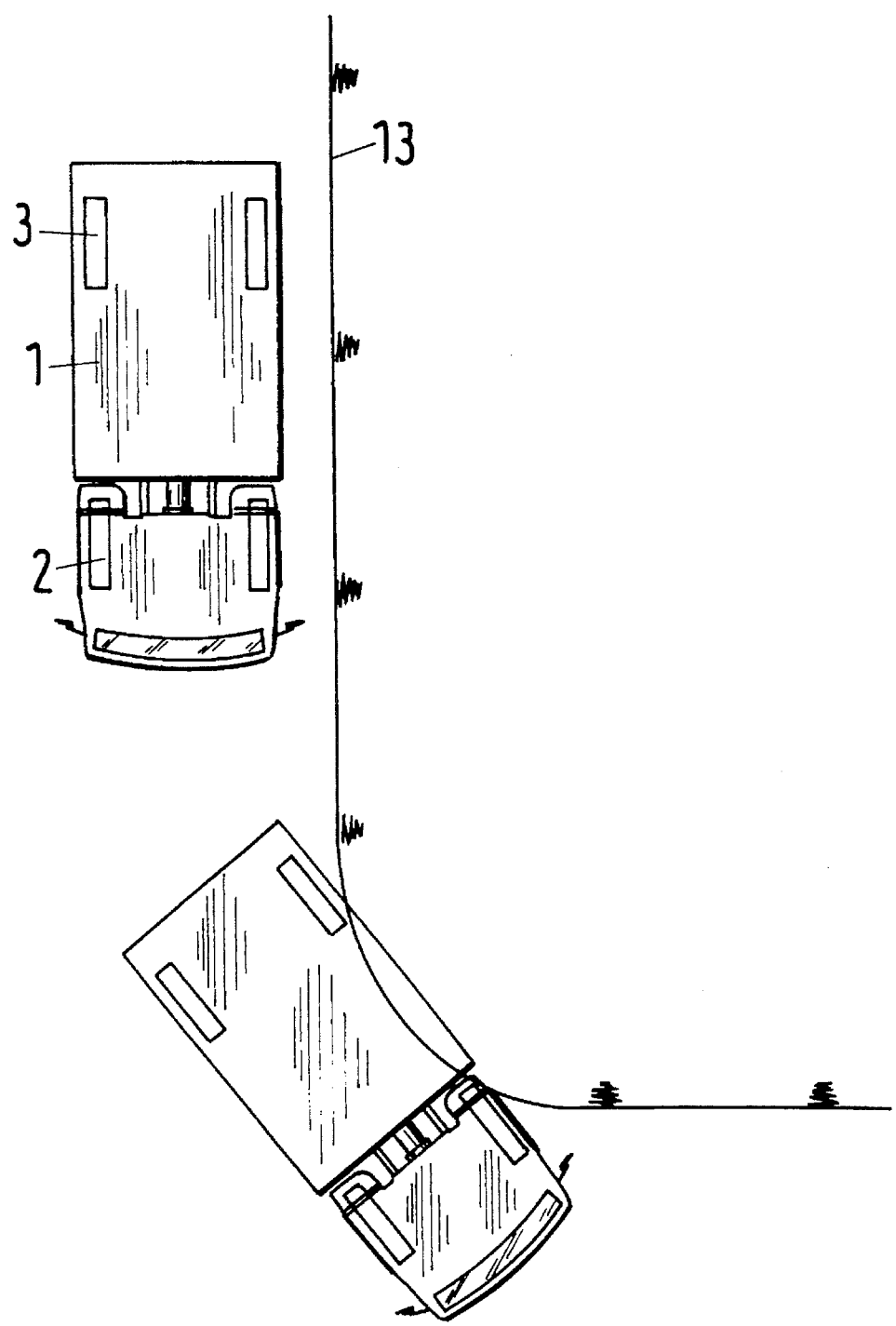
FIG. 11 shows the movement of the vehicle upon interruption of a direction of movement.

FIG. 11 demonstrates an assumed condition in which the safety program does not enter into action. In accordance with this figure, the same situation prevails as shown in FIG. 10. The vehicle 1 approaches the reference plane 13 of the obstacle, with the steering in position for uniform travel around a curve. The driver changes the steering position due to unforeseen circumstances, interrupting the travel around the curve. If the special safety program is not in operation then, due to the normal program the steering proportionality of the wheels of both vehicle axes continuously maintained and along with the front wheels, the rear wheels are also moved into a straight forward position. Therefore, the obstacle or reference plane 13 would now be struck and driven over.

Figure 12:
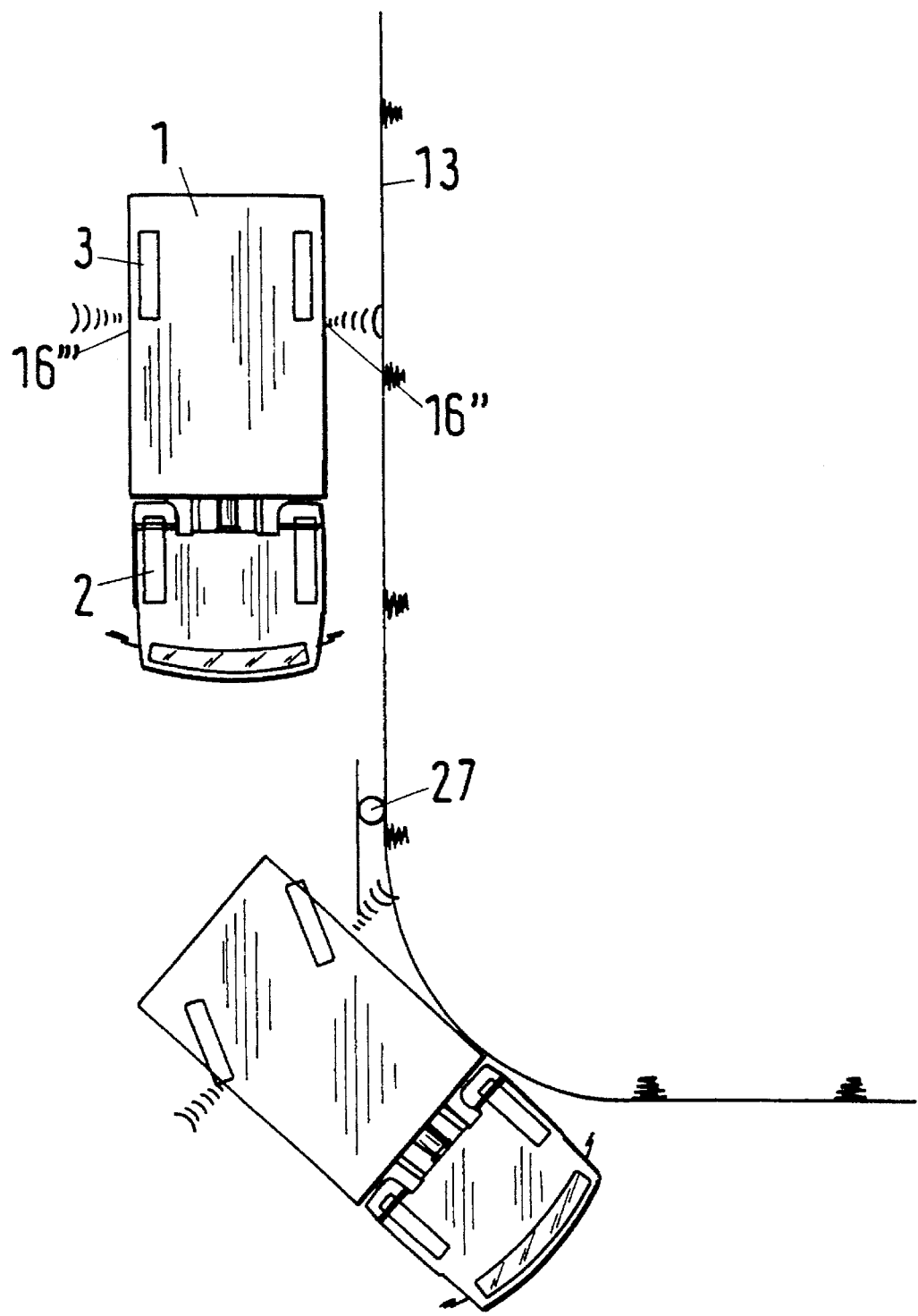
FIG. 12 shows the movement of the vehicle upon recognition of an obstacle using the safety program.

FIG. 12 shows the same travel surface as the preceding figures, but with the situation shown in FIG. 11. Furthermore, a bicycle rider 27 has approached the rear of the vehicle 1 on the side of the reference plane 13 and enters the region of the corner directly in the range of action of the sensor 16". As shown in FIG. 11, the bicycle rider 27 obstacle would now collide with the rear part of the vehicle 1. By the recognition of this obstacle the steering direction of the wheels 3 of the rear axle originally set for travel around a curve is retained, the vehicle 1 moves away, without contact with the obstacle, and then, after passing it, returns again to the proportionally adapted steering relationship of the wheels 2, 3 of the two axles of the all wheel steering with the front axle.

I claim:

1. A process for steering a road vehicle having all wheel steering for placing the vehicle into, within, and out of constricted spaces and small, constricted travel areas, said vehicle having a front, a rear, a longitudinal axis, front wheels, steerable rear wheels, said all wheel steering being proportional between said front and rear wheels for turning the vehicle about a turning radius, means for determining the distance of said vehicle from an obstacle, and means for restricting or disabling the steerability of said rear wheels in response to the proximity of the obstacle, the process comprising driving the vehicle to the proximity of said obstacle, determining the distance of the vehicle from a location on the obstacle when said vehicle approaches said obstacle closer than by a predetermined distance, determining the relative angle of said longitudinal axis to the location on the obstacle, and adjusting the steering of the rear wheels in response to changes in said angular position to move the vehicle along said obstacle without the wheels contacting the obstacle.

2. The process of claim 1, wherein said determining the distance is carried out by one or more (i) mechanical contacting sensors adapted resiliently to contact the obstacle, or (ii) contactless optical or electronic sensors attached from the vehicle.

3. The process of claim 1, further comprising adjusting the rear wheels to a turning radius extending beyond the obstacle when the rear wheels move the rear of the vehicle to said predetermined distance, and when the longitudinal axis is substantially parallel to the obstacle.

4. The process of claim 1, further comprising deactivating the sensing of the distance during turning until completion of the turn, when the front wheels are turned at a larger angle than the rear wheels and said location is outside the turning radius.

5. The process of claim 1, further comprising steering the rear wheels for movement of the rear of the vehicle to said predetermined distance when the longitudinal axis is at an acute angle to the reference plane and a rear wheel of the vehicle is at said predetermined distance.

6. The process of claim 1, further comprising blocking the steerability of the rear wheels from further approaching the obstacle when the vehicle approached the obstacle beyond said predetermined distance.

7. The process of claim 6, further comprising releasing the blocked steerability of the rear wheels when said relative angle is determined to be greater than a predetermined acute angle.

8. The process of claim 1, further comprising terminating said proportional steering between said front and said rear wheels with said rear wheels being held in the position in which they were at the time of said terminating, when said vehicle moved closer than said predetermined distance, and reestablishing said proportional steering when said vehicle moved further than said predetermined distance.

9. The process of claim 1, wherein said vehicle further comprises a computer, and wherein said determining of distance is carried out from both sides of said vehicle by the use of said computer for adjustment of said all wheel steering to avoid the obstacle.

10. The process of claim 1, further comprising suspending said determining of distance outside of the turning radius when the front and rear wheels are steered for turning along a curve and the front wheels are steered around a turning radius that is smaller than that of the rear wheels, said suspending taking place until the turning around the curve is completed.

11. The process of claim 1, further comprising disengaging the steerability of said rear wheels when said obstacle is approached closer than said predetermined distance, whereby the rear wheels remain fixed at the steering angle in which they were at the time of the disengaging, and optionally manually reengaging the steerability of the rear wheels to a proportional steering ratio between the front and rear wheels when the vehicle moved further than said predetermined distance.

12. The process of claim 1, further comprising terminating the steerability of said rear wheels in a position parallel to said longitudinal axis, when said vehicle moved further than said predetermined distance.

13. A road vehicle for travel into, within, and out of constricted places and small, constricted travel areas and being steerable without contacting any obstacle, said vehicle having a front, a rear, a longitudinal axis, front wheels, rear wheels, and all wheel steering that is proportional between said front and rear wheels for turning the vehicle about a turning radius, the improvement which comprises means for determining the distance of said vehicle from said obstacle, means for restricting or disabling the steerability of said rear wheels in response to the proximity of the obstacle, a front sensor for determining the distance between the front of the vehicle and the closest point on the obstacle to the front of the vehicle, a rear sensor for determining the distance between the rear of the vehicle and the closest point on the obstacle to the rear of the vehicle, a computer for receiving signals from said front sensor and said rear sensor for determining the relative angle of said longitudinal axis to a line defined by each of said points, and means for actuating said means for restricting or disabling the steerability of said rear wheels toward the obstacle when at the rear of the vehicle said distance to the obstacle falls below a predetermined value.

14. The road vehicle of claim 13, wherein said rear sensor is attached to the vehicle forward of the rear wheels.

15. The road vehicle of claim 13, wherein said front and rear sensors are mechanical sensors for contacting the obstacle, contactless optical sensors, or electronic sensors disposed on both sides of the vehicle.

* * * * *